May 3, 1932. E. R. HELLMAN 1,856,279
METHOD OF MAKING PISTON RINGS
Original Filed July 11, 1930
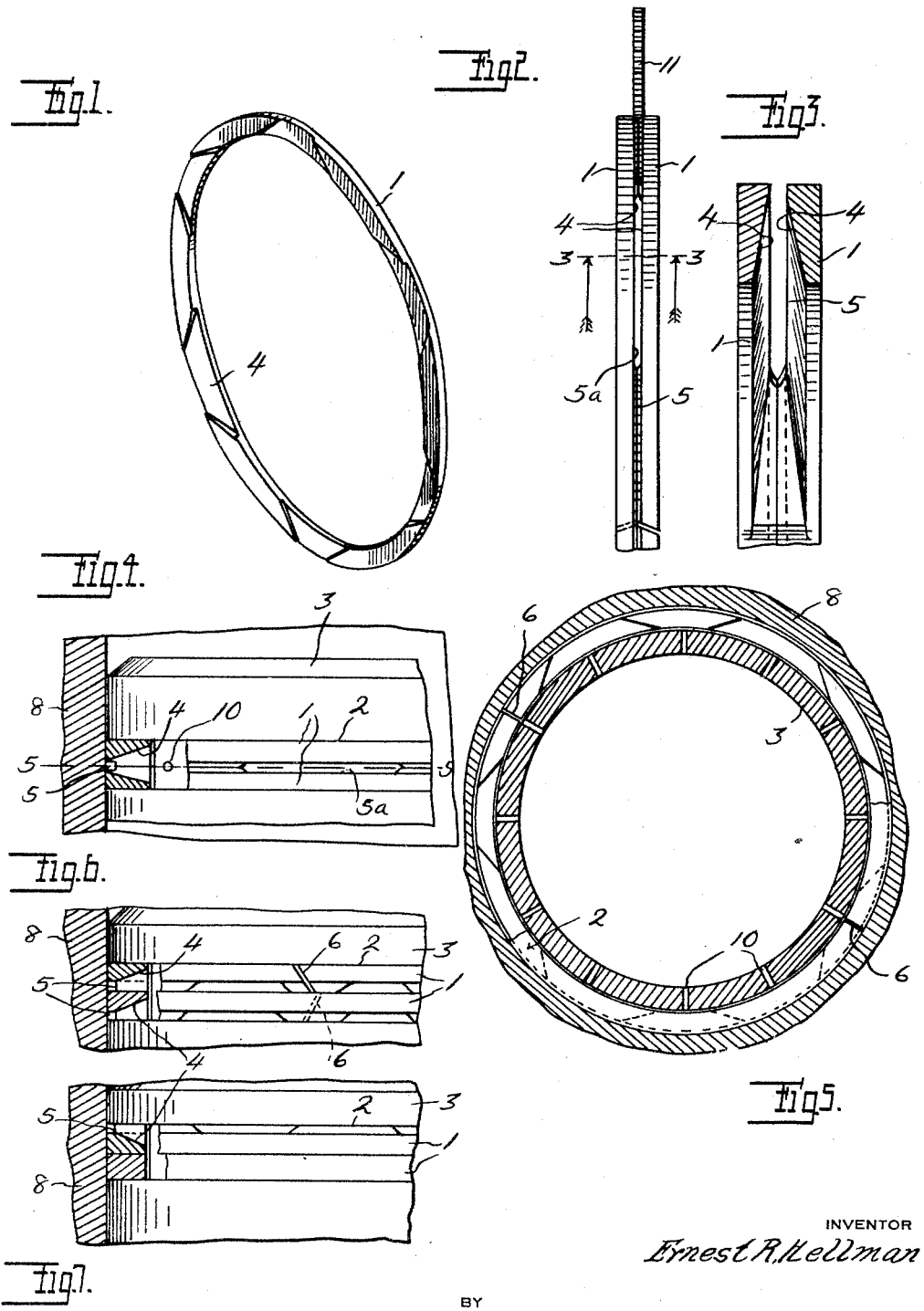
INVENTOR
Ernest R. Hellman
BY
ATTORNEY Patented May 3, 1932

1,856,279

UNITED STATES PATENT OFFICE

ERNEST R. HELLMAN, OF DETROIT, MICHIGAN

METHOD OF MAKING PISTON RINGS

Original application filed July 11, 1930, Serial No. 467,275. Divided and this application filed January 15, 1931. Serial No. 508,986.

This invention relates to piston rings and more particularly to methods of making piston rings, this being a divisional of my pending application, Serial No. 467,275, filed July 11, 1930.

An object of the invention is to produce by an improved method a piston ring having a provision for preventing oil leakage past the ring and facilitating a radial flow through the ring of such surplus oil as it encounters, so that such oil may be returned to the crankcase through the usual passages opening through the piston wall from the ring grooves.

This and various other objects the invention attains by the construction hereinafter described, and illustrated in the accompanying drawings:

Fig. 1 is a perspective view of one of a pair of duplicate members, forming the ring produced by the improved method.

Fig. 2 is a view illustrating a means for forming the two parts of the improved ring with a shallow groove in the cylinder-engaging face of the ring to trap oil.

Fig. 3 is a cross-sectional view of the ring, taken upon the line 3—3 of Fig. 2.

Fig. 4 is a fragmentary, elevational view of a piston, sectionally showing the ring engaged in a groove of said piston, and sectionally showing the associated cylinder wall.

Fig. 5 is a cross-sectional view of the same, taken in part upon the line 5—5 of Fig. 4.

Fig. 6 is a view similar to Fig. 4, but showing an alternative ring construction.

Fig. 7 is another view similar to Fig. 4, and showing a further modification of the ring.

In these views, the reference character 1 designates a pair of annular, duplicate parts which jointly form a piston ring, said parts in use lying side by side in the usual groove 2 of a piston 3. One side face of each of said parts is formed with circumferentially elongated bevels 4 at regular intervals, forming angles preferably approximating twenty-five degrees with said side faces. In the assembled relation of the parts 1, the bevels 4 are so opposed on said parts as to converge toward the outer face of the ring, tending to meet closely adjacent to said face, as best appears in Fig. 3. In the outer face of the ring there is cut an annular groove 5, jointly formed in the parts 1, and having its depth suitable to take care of surplus oil. This groove, as Fig. 3 best shows, intersects the recesses 5a opening from the inner face of the ring and jointly formed by the bevels 4. Each part 1 is split, as indicated at 6, to permit a compression of the ring, the split ends of the two parts being at opposite sides of the ring when the latter is assembled, as Fig. 5 makes clear.

As the piston reciprocates, any surplus oil finding its way between the ring and cylinder wall is trapped in the grove 5 and delivered through the passages 5a and openings 10 in the piston wall, leading from the groove 2 to the piston interior, whence it may drip back to the crank-case.

The inwardly flaring form of the passages 5a offers a minimum of resistance to oil flowing from the outer face of the ring for a given area of opening in said face, and further has been found much less susceptible to clogging by carbon deposits than passages of constant cross-section or flaring toward the outer face of the ring.

In the preferred method of forming the described ring, there is initially formed a pair of annular castings 1, each having cored in a side face thereof a series of bevels 4, as best appears in Fig. 1. The outer faces of said castings and their side faces, exclusive of the bevels 4, are next ground smooth, and a small segment is then sawed or otherwise cut from the ring, so as to permit the resulting beveled end faces 6 to be brought into close proximity on contraction of the ring to its working diameter. The members 1 are then firmly held, through any suitable means, in the contact illustrated in Fig. 2, their beveled faces being adjacent, and by a circular saw 11 or other suitable tool, the shallow groove 5 is jointly formed in their outer faces, its depth being such as to intersect the oil passages 5a. The ring is now ready for assembly, the assembling operation consisting in establishing the two rings side by side with their beveled faces registered circumferentially.

While it is apparent that the illustrated embodiment of my invention is well calculated to adequately fulfill the objects and advantages primarily stated, it is to be understood that the invention is susceptible to variation, modification and change within the spirit and scope of the subjoined claims.

What I claim is:

1. A method of forming piston rings consisting in initially producing in a pair of duplicate annular members similar circumferentially spaced bevels, such as to progressively reduce the thickness of said members toward their inner faces, splitting said members, placing said members in juxtaposition with the bevels of one opposing those of the other, and forming jointly in the outer faces of said members a circumferential groove intersecting said bevels.

2. A method of forming piston rings consisting in initially producing a pair of substantially identical annular casting each having cored in one of its side faces a plurality of similar circumferentially spaced bevels, such as to progressively reduce the thickness of said castings toward their inner peripheries, establishing said members in coaxial juxtaposition with their beveled sides contiguous, and cutting a circumferential groove, intersecting said bevels, jointly in the outer peripheries of said members.

3. A method of forming piston rings consisting in initially forming each of a pair of substantially identical annular members, with a plurality of circumferentially spaced channels extending between the outer and inner periphery of such member and having its walls acutely diverging from the outer to the inner periphery, establishing said members in a coaxial relation with their channeled faces contiguous, and cutting a circumferential groove, intersecting said channels, jointly in the outer peripheries of said members.

In testimony whereof I sign this specification:

ERNEST R. HELLMAN.